(12) United States Patent
Macdonald

(10) Patent No.: US 10,269,109 B2
(45) Date of Patent: Apr. 23, 2019

(54) LABEL INSPECTION AND REJECTION SYSTEM AND METHOD FOR USE THEREOF

(71) Applicant: ORORA NORTH AMERICA, Buena Park, CA (US)

(72) Inventor: Donald G. Macdonald, Roseville, CA (US)

(73) Assignee: Orora Packaging Solutions, Buena Park, CA (US)

( * ) Notice: Subject to any disclaimer, the term of this patent is extended or adjusted under 35 U.S.C. 154(b) by 118 days.

(21) Appl. No.: 15/229,042

(22) Filed: Aug. 4, 2016

(65) Prior Publication Data

US 2018/0025487 A1  Jan. 25, 2018

Related U.S. Application Data

(60) Provisional application No. 62/365,759, filed on Jul. 22, 2016.

(51) Int. Cl.
*G06T 7/00* (2017.01)
*B07C 3/08* (2006.01)
*B07C 5/342* (2006.01)

(52) U.S. Cl.
CPC .............. *G06T 7/0006* (2013.01); *B07C 3/08* (2013.01); *B07C 5/342* (2013.01); *B07C 5/3422* (2013.01)

(58) Field of Classification Search
CPC ........ G06T 7/0006; B07C 5/3422; B07C 3/08
USPC .......................................................... 348/91
See application file for complete search history.

(56) References Cited

U.S. PATENT DOCUMENTS

| | | | | |
|---|---|---|---|---|
| 4,147,252 A | * | 4/1979 | Burkhardt | B07C 3/08 198/732 |
| 5,132,791 A | * | 7/1992 | Wertz | B65H 43/04 250/559.46 |
| 5,353,356 A | * | 10/1994 | Waugh | B07C 5/10 348/130 |
| 6,373,520 B1 | * | 4/2002 | Cadieux, Jr. | B07C 5/3422 348/125 |
| 2004/0073333 A1 | * | 4/2004 | Brill | B07C 3/08 700/224 |
| 2005/0226488 A1 | * | 10/2005 | Barry | B07C 5/3422 382/141 |
| 2006/0162515 A1 | * | 7/2006 | Vogeley, Jr. | A22C 7/00 83/13 |
| 2009/0278925 A1 | * | 11/2009 | Koval | G01B 11/245 348/92 |
| 2010/0032881 A1 | * | 2/2010 | Schererz | B07C 3/08 271/1 |

(Continued)

*Primary Examiner* — Marnie A Matt
(74) *Attorney, Agent, or Firm* — Martin & Ferraro, LLP

(57) ABSTRACT

A label inspection and rejection system and method for positioning a product package having at least two labels provided thereon relative to at least two cameras to facilitate capturing pictures and/or video of the at least two labels on the product package and for rejecting the product package if the product package is mislabeled. First and second carriers move the product package through a product-transit area such that a first label on the product package passes underneath the first camera and a second label on the product package passes overtop the second camera, and, if the product package is mislabeled, the actuator of the rejection mechanism moves the actuator arm moves to contact the product package to remove the product package from the third carrier.

20 Claims, 10 Drawing Sheets

(56) References Cited

U.S. PATENT DOCUMENTS

| | | | | |
|---|---|---|---|---|
| 2013/0223673 A1* | 8/2013 | Davis | ................ | G06K 9/78 |
| | | | | 382/100 |
| 2014/0015960 A1* | 1/2014 | Niedermeier | ........ | G01N 21/909 |
| | | | | 348/128 |
| 2014/0360924 A1* | 12/2014 | Smith | ................ | B07C 5/3422 |
| | | | | 209/10 |
| 2017/0213334 A1* | 7/2017 | Ducharme | ................ | G06T 7/62 |
| 2017/0333952 A1* | 11/2017 | Hartmann | ................ | B07C 3/08 |

* cited by examiner

LABEL INSPECTION AND REJECTION SYSTEM AND METHOD FOR USE THEREOF

CROSS REFERENCE TO RELATED APPLICATIONS

This application claims the benefit of Provisional Application No. 62/365,759, filed Jul. 22, 2016; which is incorporated by reference herein.

FIELD OF THE INVENTION

In general, the present invention relates to a label inspection and rejection system for inspecting labels applied to products and identifying mislabeled or properly-labeled packages prior to shipment.

BACKGROUND OF THE INVENTION

In the field of product packaging, it is important for correct labels to be applied on top, bottom, or both of each package that correctly correspond to each package's contents. With the massive and rapid production of different types of packaging for numerous different kinds of products, mistakes can occur during the packaging and labelling process, resulting in mislabeled packages. Without an efficient label inspection system, it is difficult and ineffective to inspect the labels on both the tops and bottoms of each of the packages to verify the labels and prevent the mislabeled packages from being further shipped to consumers.

Conventional label inspection systems employ barcode scanning. Unfortunately in most cases, the barcode only exists on one of the two labels applied to the finished packages. Any information or design on the labels; other than the barcode, cannot be verified or inspected by conventional label inspection systems.

Therefore, there exists a need for a system that can inspect and further identify mislabeled products at the end of a production line to ensure accurate product labeling on both the tops and bottoms of the packages, including not only the barcode but also the remaining portions of the labels.

SUMMARY OF THE INVENTION

The present invention in a preferred embodiment contemplates a label inspection and rejection system for positioning a product package having at least two labels provided thereon relative to at least two cameras to facilitate capturing pictures and/or video of the at least two labels on the product package and for rejecting the product package if the product package is mislabeled, the label inspection and rejection system including the at least to two cameras configured to capture pictures and/or video of the two labels provided on the product package, a frame assembly configured to support the at least two cameras thereon, the frame assembly including a first end, an opposite second end, an upper portion for supporting a first of the at least two cameras, and a lower portion for supporting a second of the at least two cameras, the frame assembly defining a product-transit area between the upper portion and the lower portion, the product-transit area extending through the frame assembly between the first and second ends, a first conveyor mechanism supported at in part by the frame assembly, the first conveyor mechanism extending at least partially through the product-transit area, the first conveyor mechanism including a first carrier and a second carrier spaced apart from one another in the product-transit area, the first carrier including at least a first engagement surface and a second engagement surface, the first engagement surface configured to engage at least a portion of a first underside portion of the product package, and the second engagement surface configured to engage at least a portion of a first side portion of the product package, the second carrier including at least a third engagement surface and a fourth engagement surface, the third engagement surface configured to engage at least a portion of a second underside portion of the product package, and the fourth engagement surface configured to engage at least portion of a second side portion of the product package, the first, second, third, and fourth engagement surfaces being moveable through at least a portion of the product-transit area from adjacent the first end to adjacent the second end of the frame assembly, and a rejection mechanism including a second conveyor mechanism including a third carrier for moving the product package through the rejection mechanism, and an actuator including an actuator arm moveable between at least a first position and a second position for contacting the product package to remove the product package from the third carrier, where, when engaged to the product package, the first and second carriers move the product package through the product-transit area such that a first label on the product package passes underneath the first camera and a second label on the product package passes overtop the second camera, and, if the product package is mislabeled, the actuator of the rejection mechanism moves the actuator arm moves from the first position to the second position to contact the product package to remove the product package from the third carrier.

The present invention in another preferred embodiment contemplates a label inspection and rejection system for positioning a product package having at least two labels provided thereon relative to at least two cameras to facilitate capturing pictures and/or video of the at least two labels on the product package, and for rejecting the product package if the product package is mislabeled, the label inspection and rejection system including the at least to two cameras configured to capture pictures and/or video of the two labels provided on the product package, a frame assembly including an upper portion, a lower portion, and a product-transit area at least partially between the upper and lower portions, the upper portion configured to support a first camera of the at least two cameras, and the lower portion configured to support a second camera of the at least two cameras, a first conveyor mechanism supported at in part by the frame assembly, the first conveyor mechanism extending at least partially through the product-transit area, the first conveyor mechanism including a first carrier and a second carrier spaced apart from one another in the product-transit area, the first carrier including at least a first engagement surface configured to engage a first portion of the product package and a second engagement surface configured to engage a second portion of the product package, and the second carrier including at least a third engagement surface configured to engage a third portion of the product package and a fourth engagement surface configured to engage a fourth portion of the product package, the first, second, third, and fourth engagement surfaces being moveable through at least a portion of the product-transit area, a rejection mechanism including a second conveyor mechanism including a third carrier for moving the product package through the rejection mechanism, and an actuator for contacting the product package to remove the product package from the third carrier, where, when engaged to the product package, the first and second carriers move the product package through the product-transit area such that a first label on the product package passes underneath the first camera and a second label on the product package passes overtop the second camera, and, if the product package is mislabeled, the actuator is actuated to contact the product package to remove the product package from the third carrier.

The present invention in yet another preferred embodiment contemplates a method of positioning a product package having at least two labels provided thereon relative to at least two cameras to facilitate capturing pictures and/or video of the at least two labels, and for rejecting the product package if the product package is mislabeled, the method including providing the product package on a first conveyor mechanism, the first conveyor mechanism including a first carrier and a second carrier; supporting the product package on at least a first engagement surface of the first carrier and a second engagement surface of the second carrier; exposing a first upwardly-facing label provided on the product package, and exposing a second downwardly-facing label provided on the product package; moving the product package at least partially through a product-transit area defined at least in part by a frame assembly via actuation of the first carrier in one of a clockwise and a counter-clockwise direction, and actuation of the second carrier in the other of a clockwise and a counter-clockwise direction; capturing pictures and/or video of the first upwardly-facing label and the second downwardly-facing label using a first camera and a second camera, respectively, of the at least two cameras, the first camera being mounted on an upper portion of the frame assembly and the second camera being mounted on a lower portion of the frame assembly; after capturing the pictures and/or video of the first upwardly-facing label and the second downwardly-facing label, moving the product package to a second conveyor mechanism; and if the product package is mislabeled, actuating an actuator to contact the product package and remove the product package from the second conveyor mechanism.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate preferred embodiments of the invention. Together with the description, they serve to explain the objects, advantages and principles of the invention. In the drawings.

DETAILED DESCRIPTION

Figure 1A:
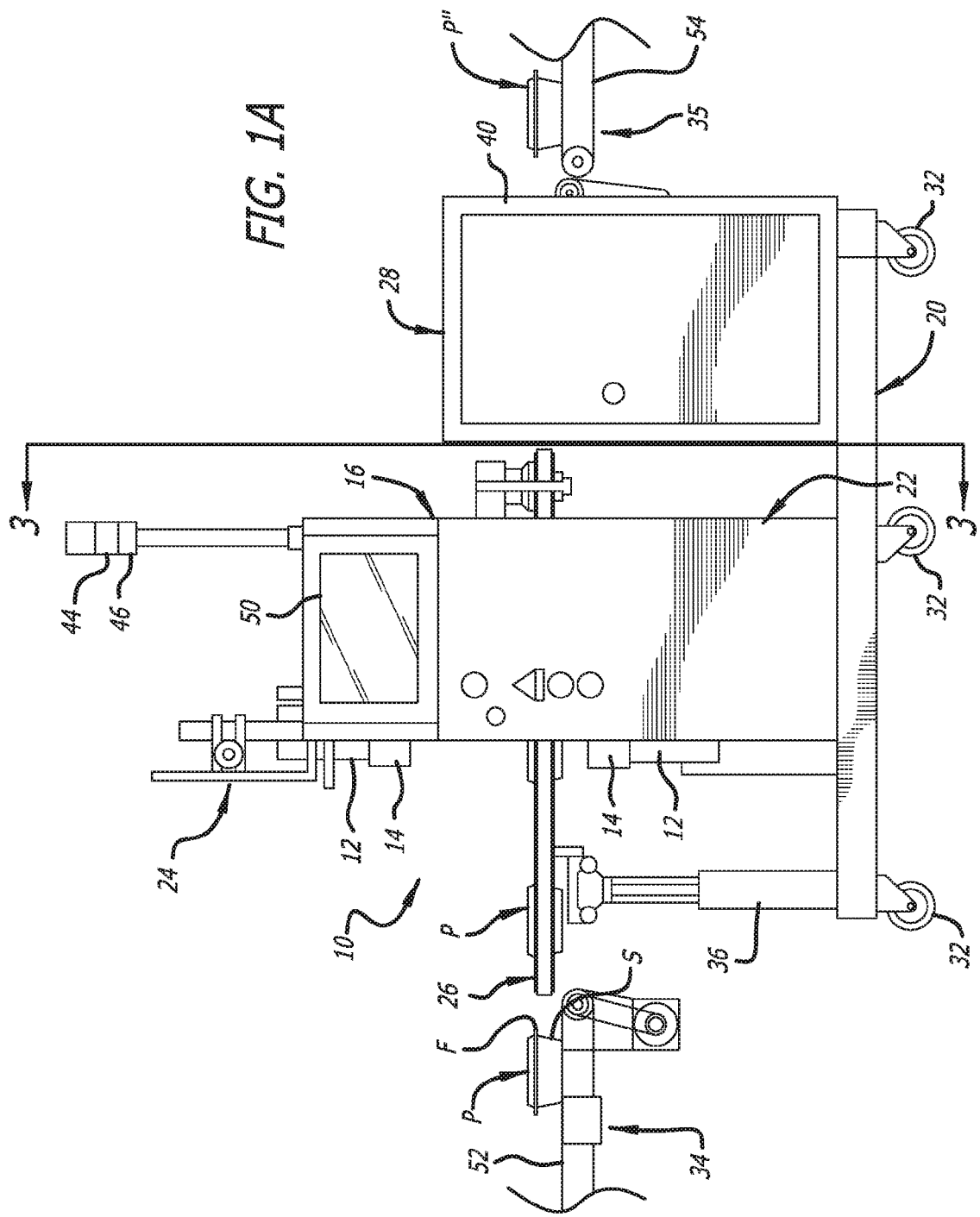
FIG. 1A is an elevational view of a first side of a first embodiment of a label inspection and rejection system according to the present invention.

The following description is intended to be representative only and not limiting, and many variations can be anticipated according to these teachings. Reference will now be made in detail to the preferred embodiments of this invention, examples of which are illustrated in the accompanying drawings.

A first embodiment of a label inspection and rejection system is generally indicated by the numeral 10 in FIGS. 1A-6. Label inspection and rejection system 10 is used to inspect labels L of packages P that pass therethrough. As discussed below, label inspection and rejection system 10 employs various cameras 12 and lights 14 for producing various images (e.g., pictures and/or video) of labels L applied to product packages P, and employs a computer system 16 to process the images of labels L to determine if at the very least labels L have been correctly applied to packages P. Computer system 16 as well as cameras 12 and lights 14 can be incorporated from a V2630 Mettler Toledo vision system or a COGNEX vision system, for example.

As depicted in FIGS. 1A-6, label inspection and rejection system 10 also includes a support platform 20, a control cabinet 22, a frame assembly 24, a first conveyor mechanism 26, a rejection mechanism 28, and a second conveyor mechanism 30. Support platform 20 supports the components of label inspection and rejection system 10. Furthermore, label inspection and rejection system 10 is portable, and it can be easily positioned and repositioned using casters 32 attached to support platform 20.

Because label inspection and rejection system 10 is portable and can be positioned and repositioned, label inspection and rejection system 10 can be incorporated into an existing packaging line. For example, label inspection and rejection system 10 can be positioned adjacent a first packaging line conveyor 34, or interposed between first packaging line conveyor 34 and a second packaging line conveyor 35. First and second packaging line conveyors 34 and 35 can be positioned at or adjacent the end of the packaging line, and thus, labels L can be examined and rejected (if necessary) by label inspection and rejection system 10 just prior to packages P being boxed up for shipment.

As discussed below, first conveyor mechanism 26 and second conveyor mechanism 30 are used for moving packages P through label inspection and rejection system 10, and rejection mechanism 28 is used to remove mislabeled packages P' from second conveyor mechanism 30.

Figure 1B:
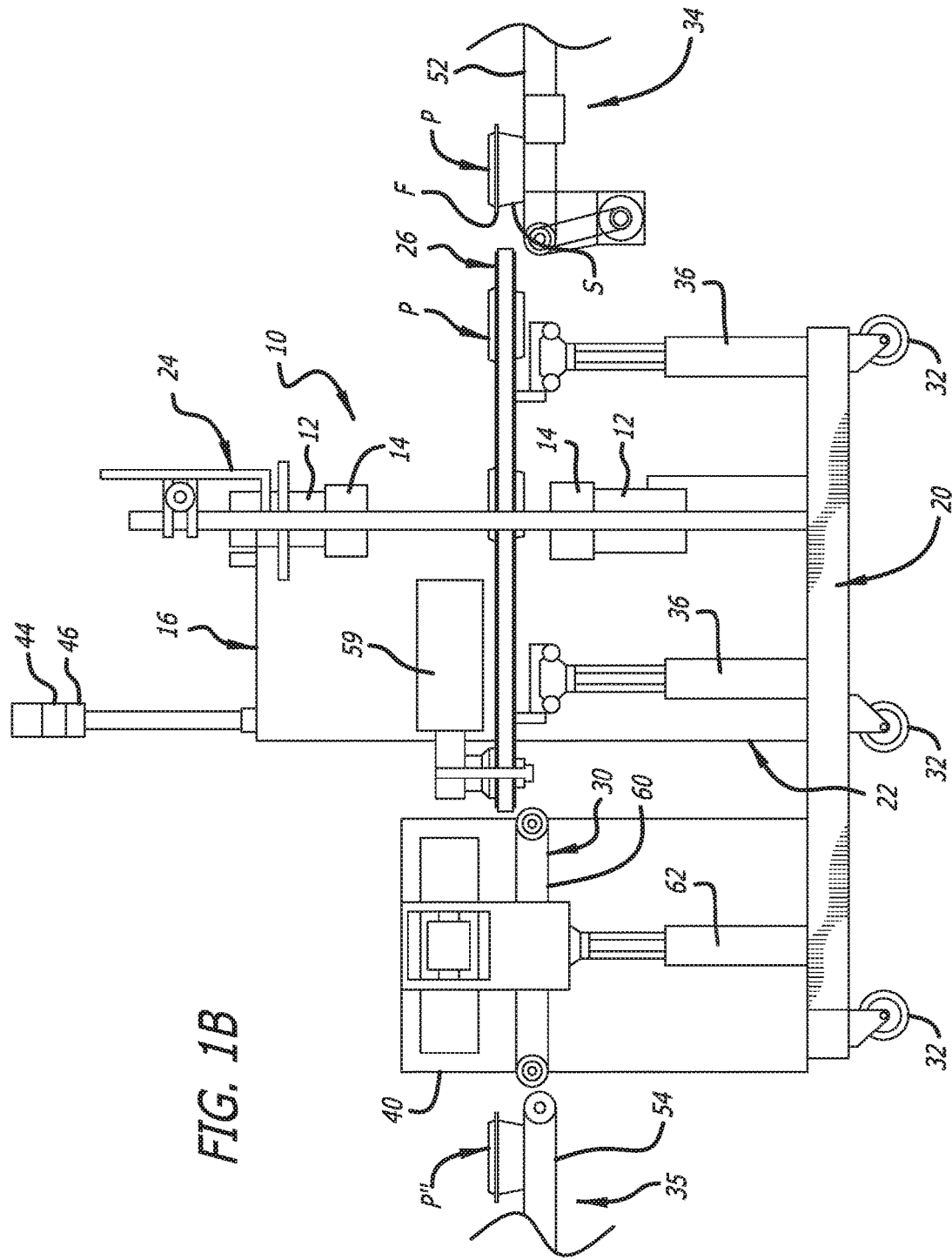
FIG. 1B is an elevational view of a second side of the label inspection and rejection system of FIG. 1A.
Figure 3:
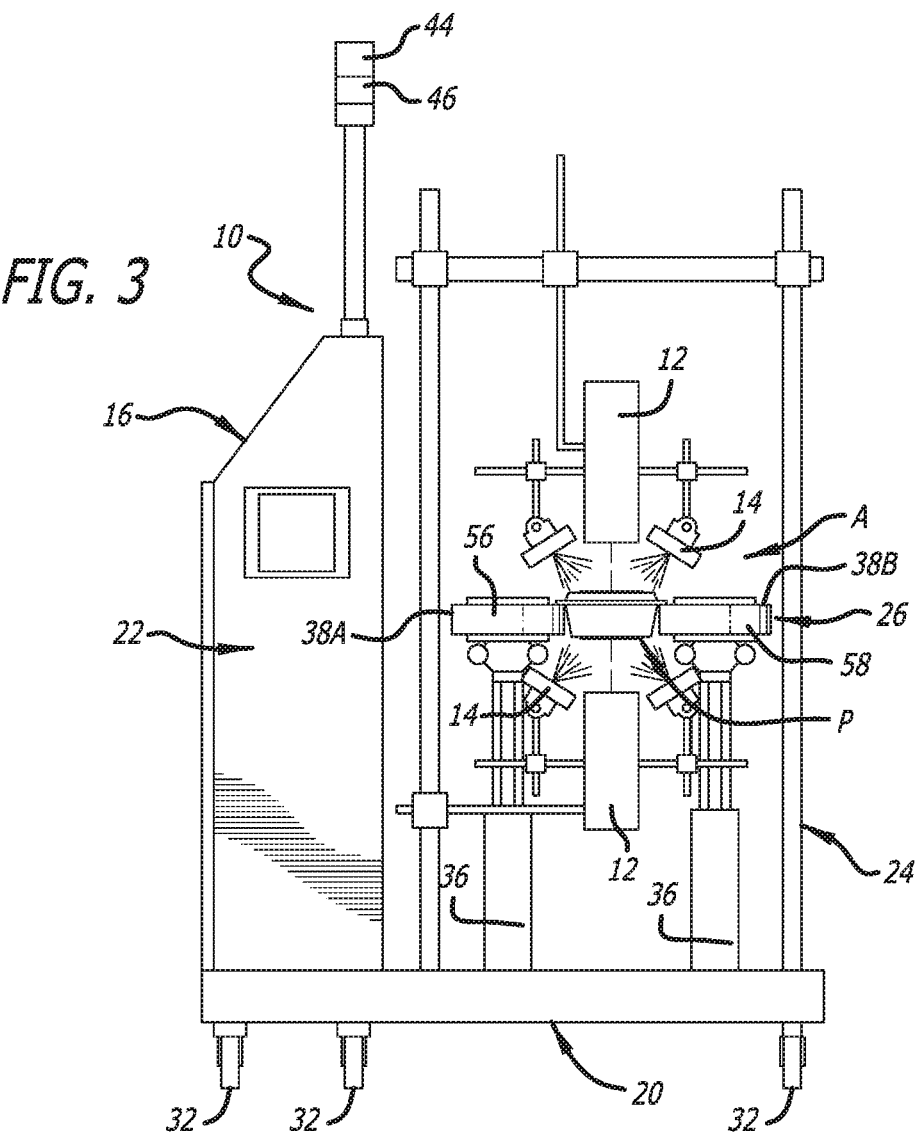
FIG. 3 is a partial view of the label inspection and rejection system of FIG. 1A taken along Line 3-3 of FIG. 1A.

As depicted in FIGS. 1A, 1B, and 3, frame assembly 24 is attached to support platform 20, and frame assembly 24 supports cameras 12, lights 14, and first conveyor mechanism 26. Frame assembly 24 includes adjustable support mechanisms 36 for supporting first conveyor mechanism 26. Adjustable support mechanisms 36, as discussed below, can support various portions of first conveyor mechanism 26, and are adjustable in height to facilitate adjustment of the height of first conveyor mechanism 26. For example, adjustable support mechanisms 36 can include fixed portions and telescoping portions to adjust the heights thereof.

Furthermore, one or more of cameras 12 and one or more of lights 14 can be provided on an upper portion of frame assembly 24, and one or more of cameras 12 and one or more of lights 14 can be provided on a lower portion of frame assembly 24. Frame assembly 24 also defines a product-transit area A between portions of the upper portion and the lower portion of frame assembly 24. At least a portion of first conveyor mechanism 26 extends through product-transit area A, and product packages P travel through at least a portion of product-transit area A.

Cameras 12 and lights 14 via operation thereof controlled by computer system 16 facilitate production of images (e.g., pictures and/or video) of labels L applied to packages P moved along first conveyor mechanism 26. Labels L can be applied, for example, on top and bottom surfaces of packages P. The position of cameras 12 and lights 14, and, as discussed below, the configuration of first conveyor mechanism 26 enable both the top and bottom surfaces of packages P to be viewed and detected by cameras 12. Computer system 16 is used to activate cameras 12 and lights 14 at a predetermined position of packages P along first conveyor mechanism 26.

The images produced by cameras 12, as discussed above, are processed by computer system 16 to determine at the very least whether labels L on packages P are correct. In processing the images of labels L, computer system 16 can compare the images of labels L to reference images stored thereby to determine if packages P are mislabeled by virtue of the inaccuracy of labels L. The computer system 16 can also determine if packages P are mislabeled by virtue of labels L being creased, folded, skewed, or otherwise positioned improperly on packages P, or mislabeled by virtue of labels L being blurry. If packages P are somehow mislabeled, rejection mechanism 28 is used to remove mislabeled packages P'.

After operation of cameras 12 and lights 14 and processing of the images of labels L on packages P by computer system 16, packages P are moved from first conveyor mechanism 26 to second conveyor mechanism 30. Rejection mechanism 28 is positioned adjacent second conveyor mechanism 28, and rejection mechanism 28 via operation thereof controlled by computer system 16 is used to remove mislabeled packages P' from second conveyor mechanism 30. Properly-labeled packages P'" continue to travel along second conveyor mechanism 30 and, and, if second packaging line conveyor 35 is positioned adjacent second conveyor mechanism 30, properly-labeled packages P'" are transferred to second packaging line conveyor 35.

Figure 4:
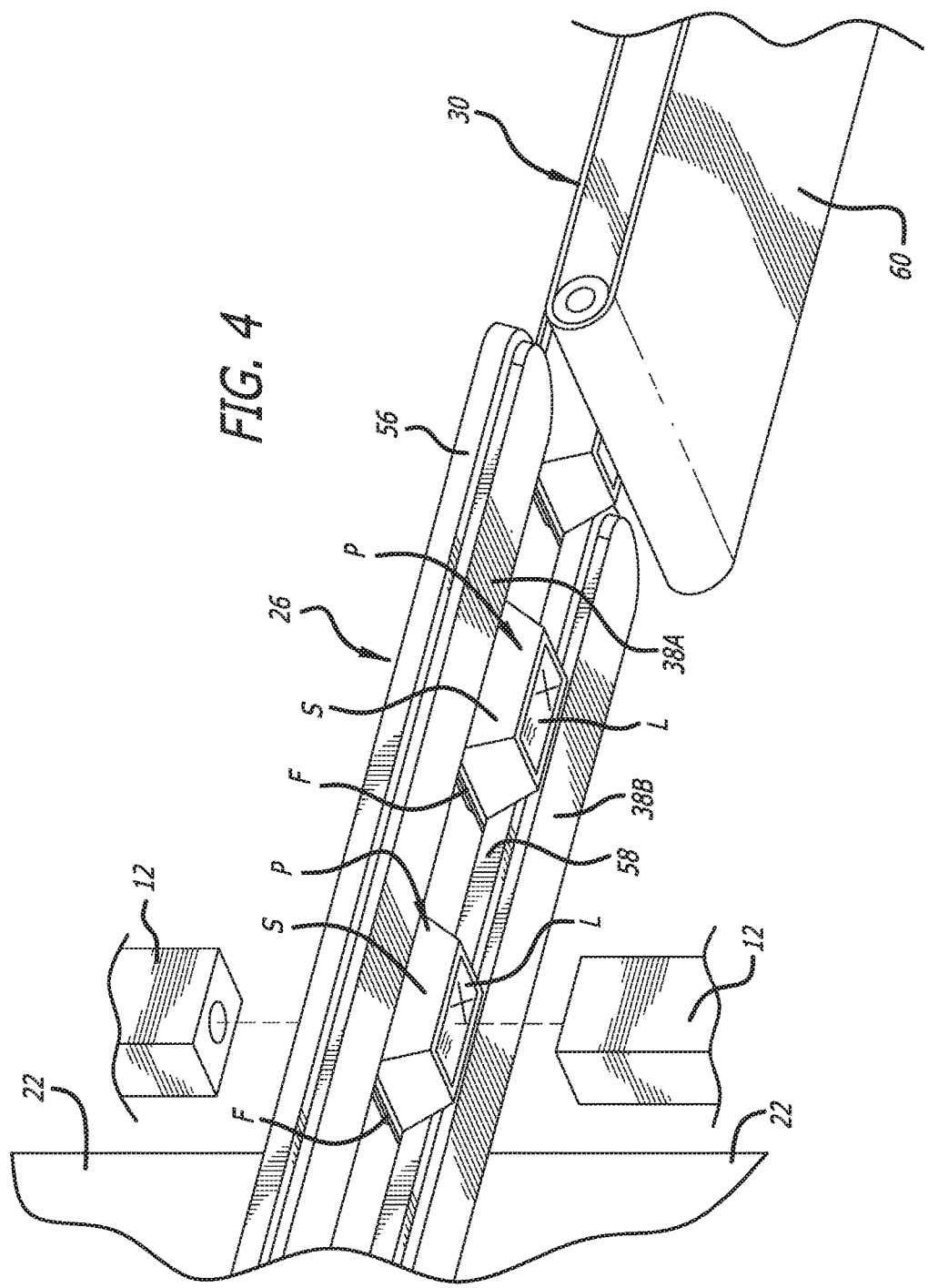
FIG. 4 is a bottom perspective view of a portion of the label inspection and rejection system of FIG. 1A.

First conveyor mechanism 26 is a hugger or gripper conveyor belt. As depicted in FIG. 4, first conveyor mechanism 26 is configured to facilitate exposure of the top and bottom surfaces of packages P and labels L provided thereon. FIG. 4 also depicts the travel of packages P along first conveyor mechanism 26, and subsequent transfer of packages P to second conveyor mechanism 30. FIG. 4 does not depict the adjustable support mechanism 36 supporting the first conveyor mechanism 26 to aid in the depiction of packages P thereon.

First conveyor mechanism 26 includes a first carrier 38A and a second carrier 38B spaced apart from one another that facilitate the transfer of packages P through product-transit area A defined by frame assembly 24 and past cameras 12 and lights 14. First carrier 38A employs a first belt 56 and second carrier 38B employs a second belt 58, and during operation thereof packages P are suspended between first and second belts 56 and 58. That is, packages P typically include a flange F and a sidewall S, and first and second belts 56 and 58 each include upper surfaces for engaging the underside of flanges F, and each include side surfaces for engaging sidewalls S. Such contact suspends packages P between first and second belts 56 and 58, and in doing so, exposes the upper and lower surfaces of packages and labels L provided thereon. First and second belts 56 and 58 can be driven by at least one drive mechanism 59 in different directions to facilitate movement of packages P thereon. For example, first belt 56 can be driven in a clockwise direction, and second belt 58 can be driven in a counter-clockwise direction.

Second conveyor mechanism 30 includes a carrier 60, such as a conveyor belt, a roller belt, or a chain conveyor that receives packages P thereon. Carrier 60 should be configured to facilitate removal of mislabeled packages P' using actuator 42. The speed of carrier 60 can be matched to the speed of first and second carriers 38A and 38B of first conveyor mechanism 26, and can receive packages P at a rapid or slow speed. Also, the size of carrier 60 can vary depending on the size of packages P. Second conveyor mechanism 30 can also be supported by an adjustment mechanism 62 attached to support platform 20 and/or frame assembly 24 facilitating the adjustment of the height of second conveyor mechanism 30.

The spacing between first and second carriers 38A and 38B of first conveyor mechanism 26 is adjustable via at least one adjustment mechanism (not shown) to accommodate different sizes of packages P. Furthermore, the height of first and second carriers 38A and 38B can be adjusted using adjustable support mechanisms 36. Thus, the spacing between first and second belts 56 and 58 can be adjusted to accommodate the width of packages P, and the height of first and second carriers 38A and 38B can be adjusted to accommodate the height of packages P leaving first packaging line conveyor 34 and the height of second conveyor mechanism 30. Likewise, the height of second conveyor mechanism 30 can be adjusted to accommodate the height of first conveyor mechanism 26 and second packaging line conveyor 35.

Figure 2:
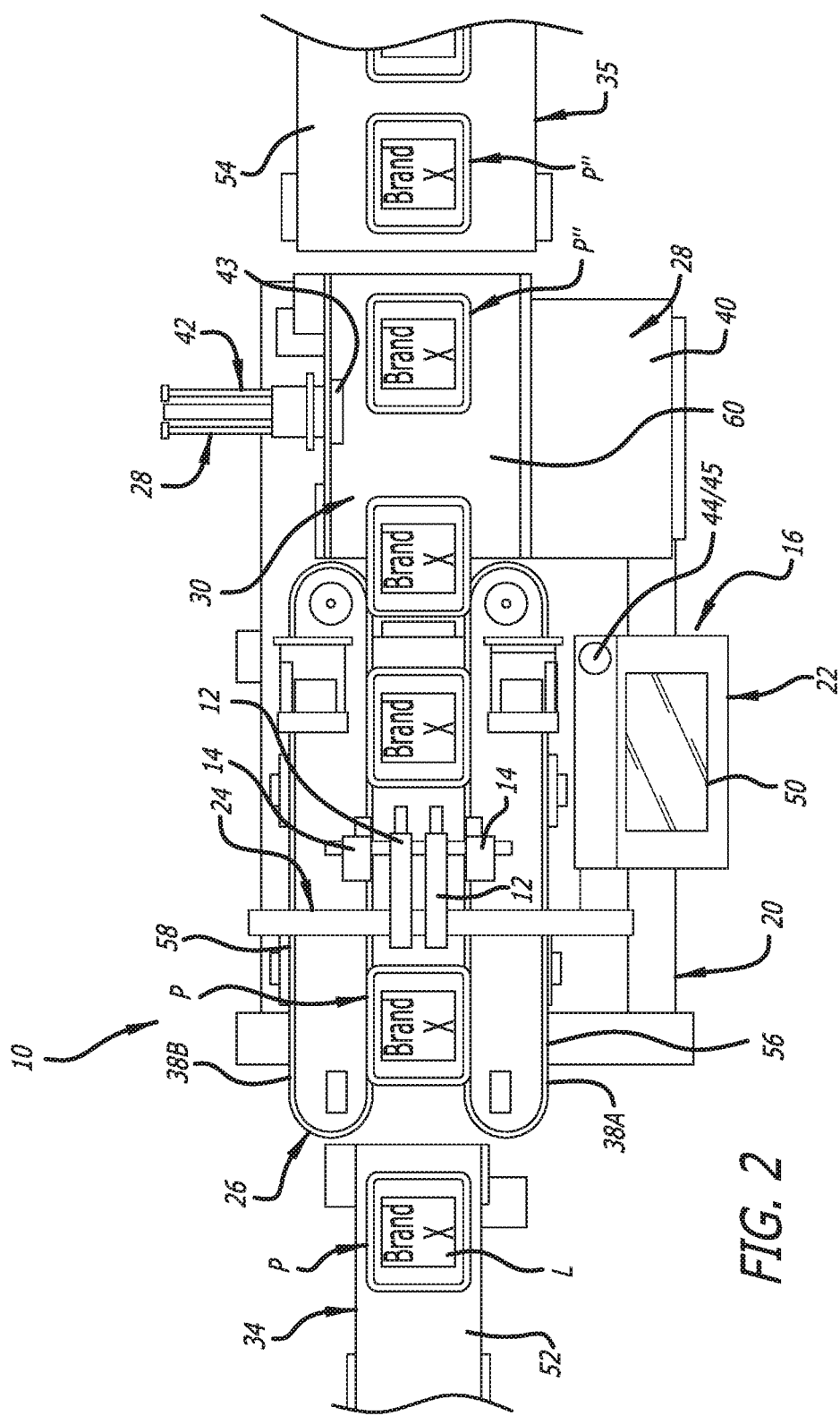
FIG. 2 is a top plan view of the label inspection and rejection system of FIG. 1A.
Figure 5:
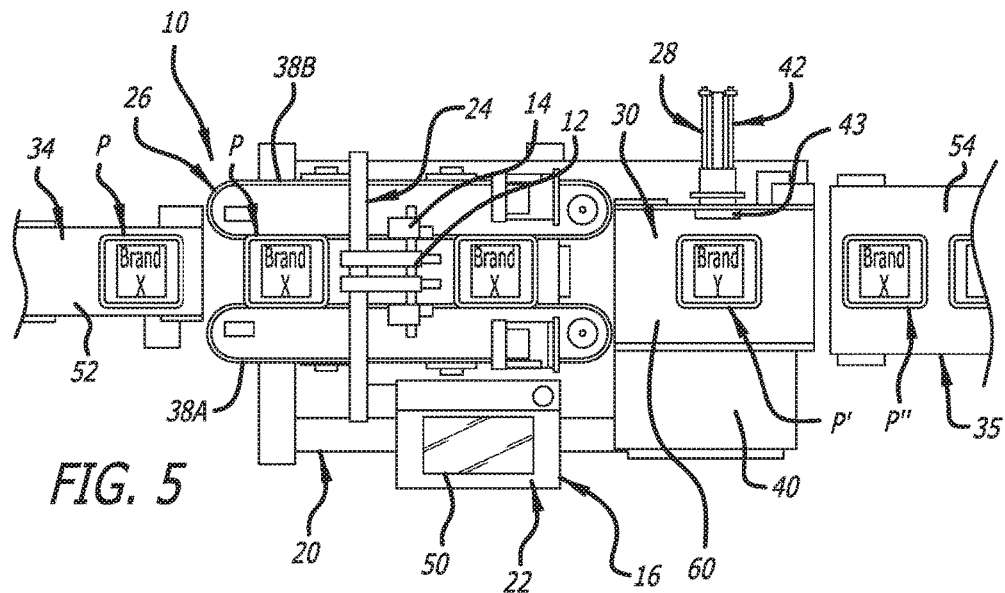
FIG. 5 is a first top plan view of the label inspection and rejection system of FIG. 1A showing operation of the rejection mechanism thereof.
Figure 6:
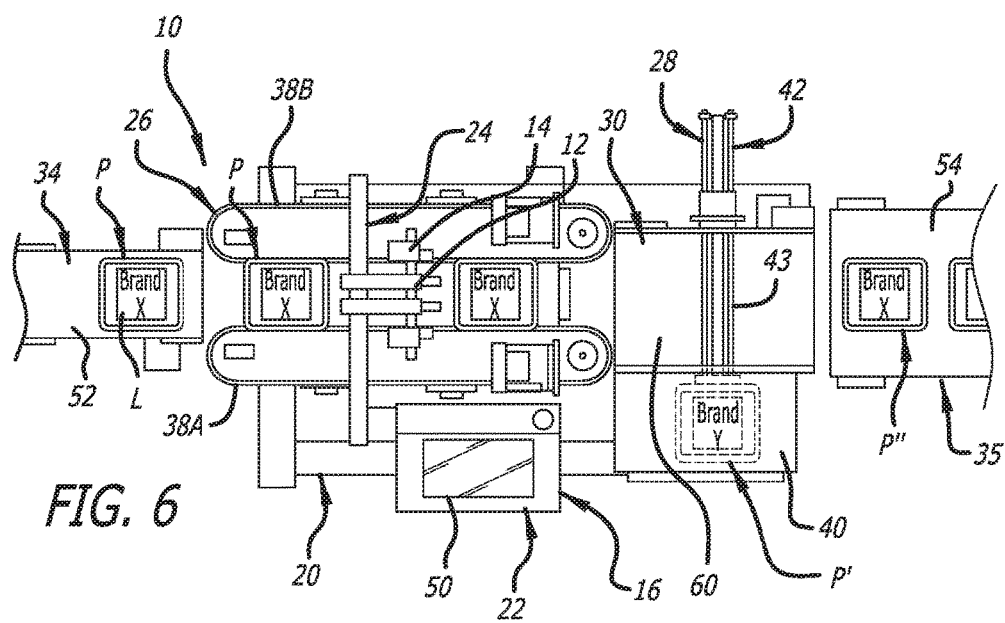
FIG. 6 is a second top plan view of the label and rejection inspection system of FIG. 1A showing operation of the rejection mechanism thereof.

Rejection mechanism 28 includes a reject bin 40 and an actuator 42. Actuator 42 via operation thereof controlled by computer system 16 quickly and accurately pushes mislabeled package P' from second conveyor mechanism 30 into reject bin 40 to be inspected for a cause of the rejection. Actuator 42 can be pneumatically, hydraulically, or motor driven, and, for example, can include a pusher arm, a pivoting arm, or a laterally moving bar that removes mislabeled packages P' into reject bin 40. As depicted in FIGS. 2, 5, and 6, actuator 42 includes a pusher arm 43 that pushes mislabeled packages P' into reject bin 40. Actuator 42 can be fast-acting so that the flow of packages P through label inspection and rejection system 10 does not have to slow down or be interrupted to remove mislabeled packages P' from second conveyor mechanism 30.

FIGS. 5 and 6 illustrate an example of the operation of rejection mechanism 28. As shown in FIG. 5, a properly-labeled package P'" travels along second conveyor mechanism 30, and then moves to second packaging line conveyor 35. Conversely, a mislabeled package P', as shown in FIG. 6, is routed to reject bin 40 by actuator 42 that pushes mislabeled package P' into reject bin 40 using pusher arm 43.

Control cabinet 22 includes computer system 16 for controlling the operation of label inspection and rejection system 10. Computer system 16 stores a predetermined image of accurate labels. Computer system 16 includes a processor (not shown), which is configured to process the detected images of the top and bottom surfaces of packages P produced by cameras 12, and a display 50, which provides various data, including the images of packages P produced by cameras 12 and pre-stored images of accurate labels. Display 50 preferably includes a touch screen where computer system 16 can be controlled. When the images of top and bottom surfaces of packages P detected by respective cameras 12 are produced, the images are analyzed based upon the predetermined image stored at computer system 16 to identify mislabeled packages P' and properly-labeled packages P". Computer system 16 can be configured to control operation of first and second conveyor mechanisms 26 and 30, as well as the operation of rejection mechanism 28. Furthermore, if more than three packages P are determined to be mislabeled in a row, computer system 16 can automatically stop first and second conveyor mechanisms 26 and 30, and a warning beacon 44 and horn 46 are activated. Additionally, computer system 16 can be configured collect and store production data displayable on display 50, such as trackable automated data with daily, weekly, and monthly production variables. Such production data can also be outputted to other computer systems.

First packaging line conveyor 34 includes a carrier 52, such as a conveyor belt, a roller conveyor, or a chain conveyor that receives packages P and transfers packages P to conveyor mechanism 26. Depending on the size and volume of packages P or user's preference, first packaging line conveyor 34 can receive a stream of packages P in rapid or slow speed at a speed matched to first and second carriers 38A and 38B of first conveyor mechanism 26, carrier 60 of second conveyor mechanism 30, and second packaging line conveyor 34. Also, the size of first packaging line conveyor 34 can vary depending on the size of packages P.

Second packaging line conveyor 35 includes a carrier 54, such as a conveyor belt, a roller conveyor, or a chain conveyor that receives packages P that pass inspection and are not rejected at rejection mechanism 28. Depending on the size and volume of packages P or user's preference, second packaging line conveyor 35 can receive a stream of properly-labeled packages P" in rapid or slow speed at a speed matched to first and second carriers 38A and 38B of first conveyor mechanism 26, carrier 60 of second conveyor mechanism 30, and first packaging line conveyor 34. Also, the size of second packaging line conveyor 35 can vary depending on the size of packages P.

Figure 7:
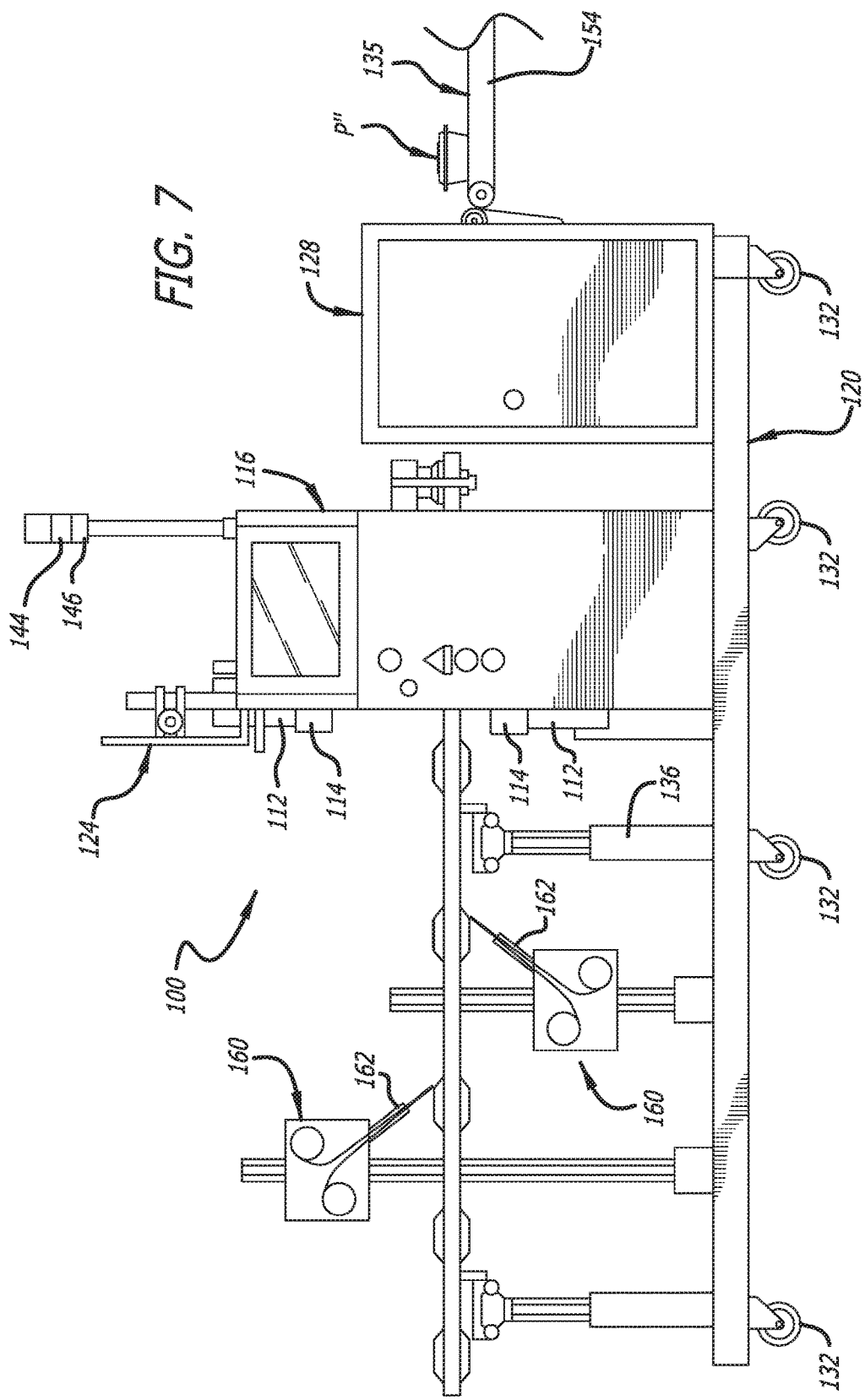
FIG. 7 is a side elevational view of a second embodiment of a label inspection and rejection system according to the present invention.

In another embodiment of the present invention, label inspection and rejection system 100 includes two label-applying mechanisms 160, as depicted in FIG. 7. Reference numerals in the 100 series correspond to reference numerals in the 10 series described above in connection with label inspection and rejection system 10. Label-applying mechanisms 160 incorporate a labeler 162, which applies a label L on the top and bottom surfaces of the packages P. Labeler 162 applies labels L on packages P while packages P travel along first conveyor mechanism 126 but before passing through frame assembly 124. Label inspection and rejection system 100 enables both label application and inspection on a single portable frame.

Figure 8:
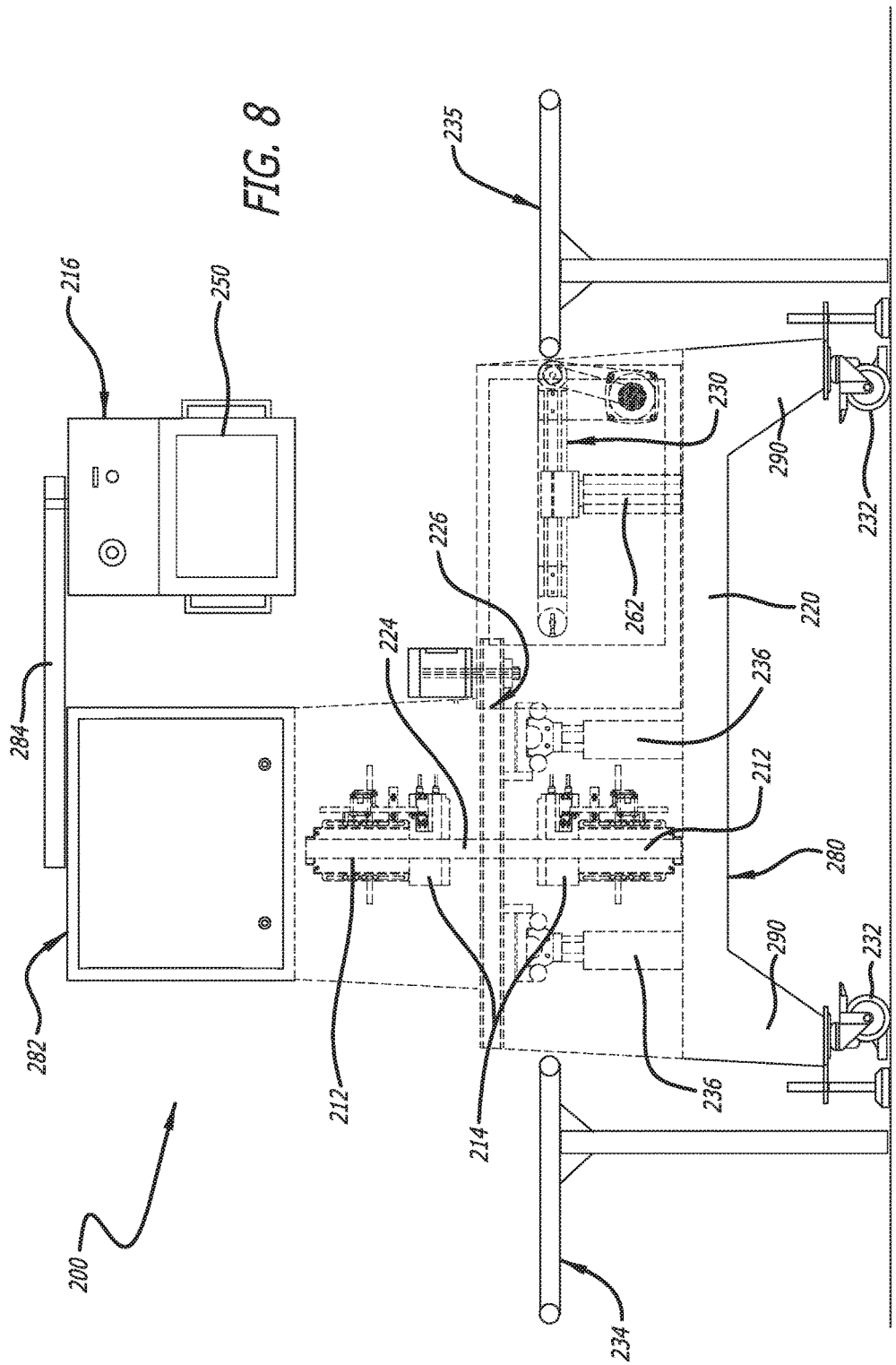
FIG. 8 is a side elevational view of a third embodiment of a label inspection and rejection system according to the present invention depicting enclosures therefor in partial phantom.
Figure 9:
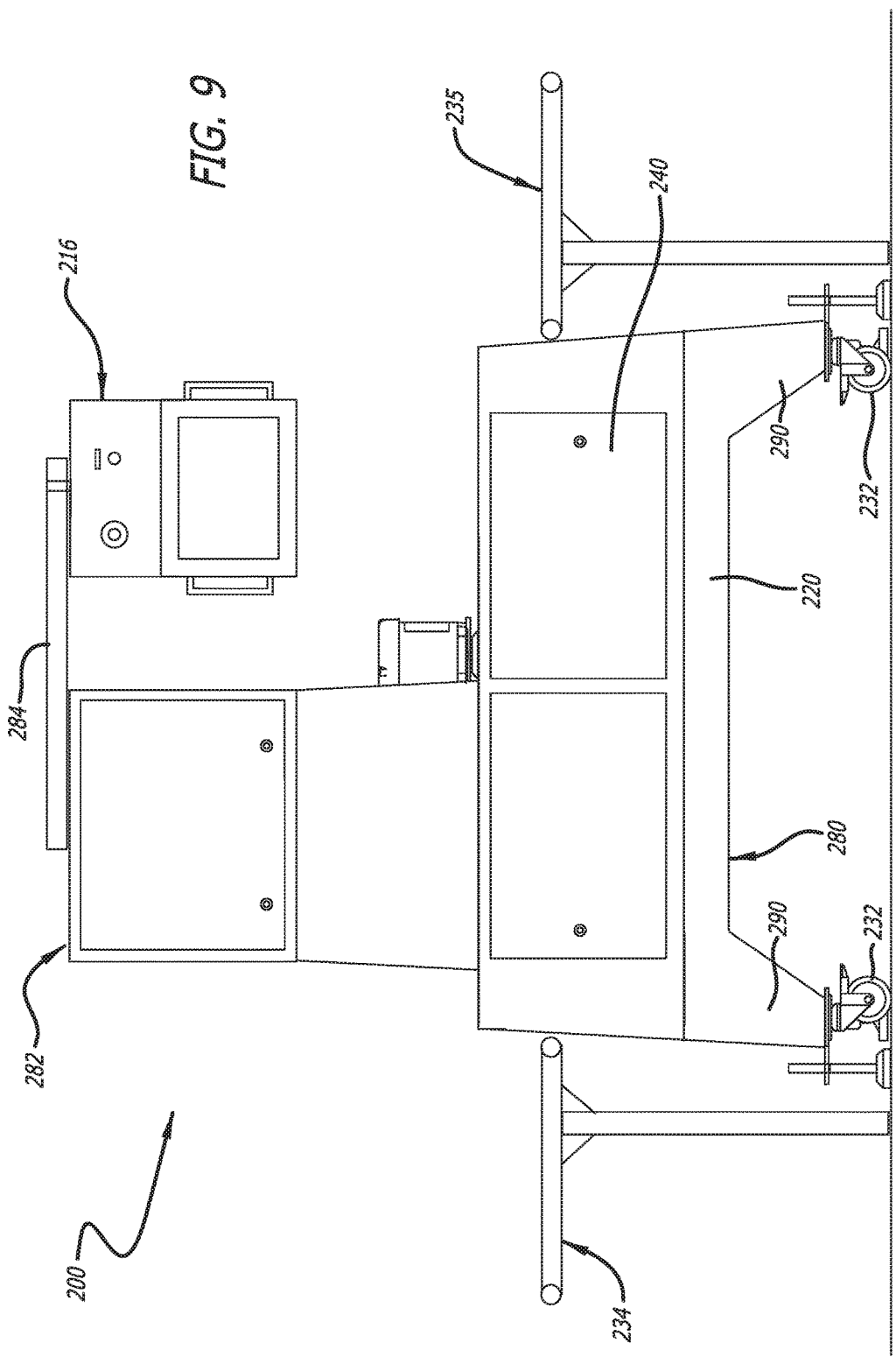
FIG. 9 is another side elevational view of the third embodiment of the label inspection and rejection system of FIG. 8 showing the enclosures enclosing the system.

In another embodiment of the present invention, label inspection and rejection system 200 includes two enclosures 280 and 282 for enclosing various components of the system 200, as depicted in FIGS. 8 and 9. Label inspection and rejection system 200 includes many of the features of label inspection and rejection system 10, and where labeled, reference numerals in the 200 series correspond to reference numerals in the 10 series described above in connection with label inspection and rejection system 10. Enclosures 280 and 282 serve in protecting the various components of label inspection and rejection system 200. Enclosure 280 can at the very least partially enclose at least portions of cameras 212, lights 214, frame assembly 224, first conveyor mechanism 226, rejection mechanism 228, second conveyer mechanism 230, support mechanisms 236, and adjustment mechanism 262, and enclosure 282 can at the very least partially enclose computer system 216 (and other electrical componentry). Furthermore, display 250 of computer system 216 can be repositioned using a support 284 attached to or integrally formed with enclosure 280.

In addition, enclosure 280 can incorporate reject bin 240 therewith, and enclosure 280 can be structured to incorporate support platform 220 therewith. Furthermore, support platform 220 can include four legs 290 (two of which are depicted in FIGS. 8 and 9). Legs 290 serve in supporting and spacing the remainder of label inspection and rejection system 200 away from the ground. Casters 232 can also be attached to legs 290 to support platform 220 to facilitate positioning and repositioning of label inspection and rejection system 200. As such, label inspection and rejection system 200 is portable, and can be incorporated into an existing packaging line. For example, label inspection and rejection system 200 can be positioned adjacent first packaging line conveyor 234, or interposed between first packaging line conveyor 234 and second packaging line conveyor 235.

Figure 10:
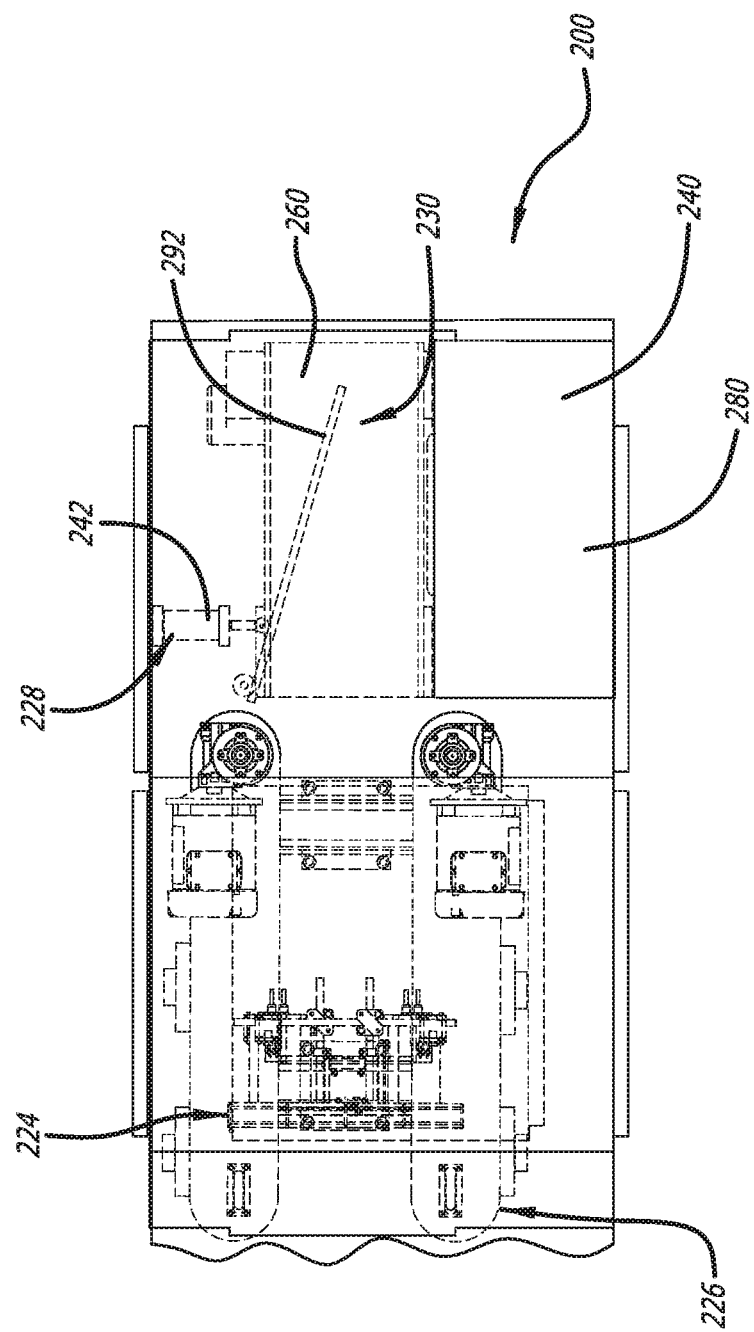
FIG. 10 is top partial fragmentary plan view of the third embodiment of the label inspection and rejection system of FIG. 8 in partial phantom.

Additionally, as depicted in FIG. 10, label inspection and rejection system 200 can incorporate a pivoting arm 292 with actuator 242 to facilitate removal of mislabeled packages P' from carrier 260. Pivoting arm 292 is moveable between a first position and a second position via actuation of actuator 242. Such movement causes pivoting arm 292 to contact mislabeled packages P', and push mislabeled packages into reject bine 240.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A label inspection and rejection system for positioning a product package having at least two labels provided thereon relative to at least two cameras to facilitate capturing pictures and/or video of the at least two labels on the product package and for rejecting the product package if the product package is mislabeled, the label inspection and rejection system comprising:
   a computer system including a processor configured to control the operation of the label inspection and rejection system, and memory configured to store predetermined images of accurate labels for the product package;
   the at least two cameras configured to capture pictures and/or video of the two labels provided on the product package, the processor configured to process the captured pictures and/or video of the two labels provided on the product package produced by the cameras;
   the processor configured to compare the captured pictures of the two labels with the predetermined images of accurate labels for the product packages stored in the memory to determine if the product package has the accurate labels or if the product package is mislabeled;

a frame assembly configured to support the at least two cameras thereon, the frame assembly including a first end, an opposite second end, an upper portion for supporting a first of the at least two cameras, and a lower portion for supporting a second of the at least two cameras, the frame assembly defining a product-transit area between the upper portion and the lower portion, the product-transit area extending through the frame assembly between the first and second ends, a first conveyor mechanism supported at least in part by the frame assembly, the first conveyor mechanism extending at least partially through the product-transit area, the first conveyor mechanism including a first carrier and a second carrier spaced apart from one another in the product-transit area, the first carrier including at least a first engagement surface and a second engagement surface, the first engagement surface configured to engage at least a portion of a first underside portion of the product package, and the second engagement surface configured to engage at least a portion of a first side portion of the product package, the second carrier including at least a third engagement surface and a fourth engagement surface, the third engagement surface configured to engage at least a portion of a second underside portion of the product package, and the fourth engagement surface configured to engage at least a portion of a second side portion of the product package, the first, second, third, and fourth engagement surfaces being moveable through at least a portion of the product-transit area from adjacent the first end to adjacent the second end of the frame assembly, and a rejection mechanism including a second conveyor mechanism including a third carrier for moving the product package through the rejection mechanism, and an actuator including an actuator arm moveable between at least a first position and a second position for contacting the product package to remove the product package from the third carrier, wherein, when engaged to the product package, the first and second carriers move the product package through the product-transit area such that a first label on the product package passes underneath the first camera and a second label on the product package passes overtop the second camera, and, if the product package is mislabeled, the actuator of the rejection mechanism moves the actuator arm from the first position to the second position to contact the product package to remove the product package from the third carrier.

2. The label inspection and rejection system of claim 1, further comprising at least three casters attached to the frame assembly, the at least three casters facilitating the portable movement of the label inspection and rejection system.

3. The label inspection and rejection system of claim 1, further comprising a first adjustable support mechanism for supporting the first carrier on the frame assembly, and a second adjustable support mechanism for supporting the second carrier on the frame assembly, wherein the first and second support mechanisms adjust upwardly and downwardly relative to the frame assembly in order to adjust the height of the first and second carriers upwardly and downwardly.

4. The label inspection and rejection system of claim 3, further comprising a first adjustment mechanism for adjusting the first carrier toward and away from the second carrier, and a second adjustment mechanism for adjusting the second carrier toward and away from the first carrier, wherein the first and second adjustment mechanisms adjust the spacing between the first and second carriers.

5. The label inspection and rejection system of claim 4, wherein the first and second adjustment mechanisms facilitate positioning of the height of the first and second carriers relative to a third conveyor mechanism positioned adjacent to the label inspection and rejection system, the height adjustment by the first and second adjustment mechanisms and the spacing adjustment by the first and second adjustment mechanisms facilitating accommodation of packages of different dimensions.

6. The label inspection and rejection system of claim 1, wherein the first and second carriers are belts, the belts each having at least an upper surface and a side surface, the side surfaces of the first and second carrier facing one another, and wherein the first engagement surface is formed on the upper surface of the belt of the first carrier, the second engagement surface is formed on the side surface of the first carrier, the third engagement surface is formed on the upper surface of the belt of the second carrier, and the fourth engagement surface is formed on the side surface of the second carrier.

7. The label inspection and rejection system of claim 6, further comprising at least one drive mechanism used to drive movement of the belts of the first and second carriers, wherein the belts of the first and second carriers are driven in different directions, the belt of the first carrier being driven in one of a clockwise and a counter-clockwise direction, and the belt of the second carrier being driven in the other of a clockwise and a counter-clockwise direction, wherein the first and second engagement surfaces of the first carrier are driven in the one of a clockwise and a counter-clockwise direction, and the third and fourth engagement surfaces of the second carrier are driven in the other of a clockwise and a counter-clockwise direction.

8. The label inspection and rejection system of claim 1, wherein the processor is configured to analyze if each of the first and second labels are properly applied to the product package, wherein the computer system controls actuation of the actuation arm of the actuator, the computer system actuating the actuation arm of the actuator to move from the first position to the second position to contact the product package to remove the product package from the third carrier.

9. The label inspection and rejection system of claim 6, further comprising at least two lights, a first of the at least two lights positioned on the upper portion of the frame assembly, a second of the at least two lights positioned on the lower portion of the frame assembly, wherein activation of the at least two cameras and the at least two lights is controlled by the computer system to illuminate the product package and capture pictures and/or video of the product package as it passes by the at least two cameras.

10. The label inspection and rejection system of claim 6, further comprising at least one drive mechanism used to drive movement of the first and second carriers, wherein the computer system is configured to control actuation of the drive mechanism to control movement of the first and second carriers and move the product package.

11. A label inspection and rejection system for positioning a product package having at least two labels provided thereon relative to at least two cameras to facilitate capturing pictures and/or video of the at least two labels on the product package, and for rejecting the product package if the product package is mislabeled, the label inspection and rejection system comprising:
  a computer system including a processor configured to control the operation of the label inspection and rejection system, and memory configured to store predetermined images of accurate labels for the product package;
  the at least two cameras configured to capture pictures and/or video of the two labels provided on the product package, the processor configured to process the captured pictures and/or video of the two labels provided on the product package produced by the cameras;
  the processor configured to compare the captured pictures of the two labels with the predetermined images of accurate labels for the product packages stored in the memory to determine if the product package has the accurate labels or if the product package is mislabeled;
  a frame assembly including an upper portion, a lower portion, and a product-transit area at least partially between the upper and lower portions, the upper portion configured to support a first camera of the at least two cameras, and the lower portion configured to support a second camera of the at least two cameras,
  a first conveyor mechanism supported at least in part by the frame assembly, the first conveyor mechanism extending at least partially through the product-transit area, the first conveyor mechanism including a first carrier and a second carrier spaced apart from one another in the product-transit area,
  the first carrier including at least a first engagement surface configured to engage a first portion of the product package and a second engagement surface configured to engage a second portion of the product package, and the second carrier including at least a third engagement surface configured to engage a third portion of the product package and a fourth engagement surface configured to engage a fourth portion of the product package, the first, second, third, and fourth engagement surfaces being moveable through at least a portion of the product-transit area,
  a rejection mechanism including a second conveyor mechanism including a third carrier for moving the product package through the rejection mechanism, and an actuator for contacting the product package to remove the product package from the third carrier,
  wherein, when engaged to the product package, the first and second carriers move the product package through the product-transit area such that a first label on the product package passes underneath the first camera and a second label on the product package passes overtop the second camera, and, if the product package is mislabeled, the actuator is actuated to contact the product package to remove the product package from the third carrier.

12. The label inspection and rejection system of claim 11, further comprising a first adjustable support mechanism for adjustably supporting the first carrier on the frame assembly, a second adjustable support mechanism for adjustably supporting the second carrier on the frame assembly, a first adjustment mechanism for adjusting the first carrier toward and away from the second carrier, and a second adjustment mechanism for adjusting the second carrier toward and away from the first carrier, wherein the first and second adjustment mechanisms facilitate positioning of the height of the first and second carriers relative to a third conveyor mechanism positioned adjacent to the label inspection and rejection system, the height adjustment by the first and second adjustment mechanisms and the spacing adjustment by the first and second adjustment mechanisms facilitating accommodation of packages of different dimensions.

13. The label inspection and rejection system of claim 11, wherein the first and second carriers are belts, the belts each having at least an upper surface and a side surface, the side surfaces of the first and second carrier facing one another, the first engagement surface being formed on the upper surface of the belt of the first carrier, the second engagement surface being formed on the side surface of the first carrier, the third engagement surface being formed on the upper surface of the belt of the second carrier, and the fourth engagement surface being formed on the side surface of the second carrier.

14. The label inspection and rejection system of claim 13, further comprising a drive mechanism used to drive movement of the belts of the first and second carriers, wherein the belt of the first carrier is driven in one of a clockwise and a counter-clockwise direction, and the belt of the second carrier is driven in the other of a clockwise and a counter-clockwise direction.

15. The label inspection and rejection system of claim 11, wherein the processor is configured to control movement of the first and second carriers to move the product package, configured to analyze if each of the first and second labels are properly applied to the product package, and configured to actuate the actuator to remove the product package from the third carrier if the product package is mislabeled.

16. A method of positioning a product package having at least two labels provided thereon relative to at least two cameras to facilitate capturing pictures and/or video of the at least two labels, and for rejecting the product package if the product package is mislabeled, the method comprising:
  providing the product package on a first conveyor mechanism, the first conveyor mechanism including a first carrier and a second carrier;
  supporting the product package on at least a first engagement surface of the first carrier and a second engagement surface of the second carrier;
  exposing a first upwardly-facing label provided on the product package, and exposing a second downwardly-facing label provided on the product package;
  moving the product package at least partially through a product-transit area defined at least in part by a frame assembly via actuation of the first carrier in one of a clockwise and a counter-clockwise direction, and actuation of the second carrier in the other of a clockwise and a counter-clockwise direction;
  utilizing a processor configured to control the operation of the label inspection and rejection system;
  storing, in memory, predetermined images of accurate labels for the product package;
  capturing pictures and/or video of the first upwardly-facing label and the second downwardly-facing label using a first camera and a second camera, respectively, of the at least two cameras, the first camera being mounted on an upper portion of the frame assembly and the second camera being mounted on a lower portion of the frame assembly;
  after capturing the pictures and/or video of the first upwardly-facing label and the second downwardly-facing label, moving the product package to a second conveyor mechanism;
  processing, with the processor, the captured pictures and/or video of the two labels provided on the product package produced by the cameras;

comparing, by the processor, the captured pictures of the two labels with the predetermined images of accurate labels for the product packages stored in the memory to determine if the product package has the accurate labels or if the product package is mislabeled; and if the product package is mislabeled, actuating an actuator to contact the product package and remove the product package from the second conveyor mechanism.

17. The method of claim 16, further comprising:

positioning the first conveyor mechanism adjacent a third conveyor mechanism;

adjusting the spacing between the first and second carriers to accommodate the size of the product package;

adjusting heights of the first and second mechanisms relative to the third conveyor mechanism to accommodate the position of the product package on the third conveyor mechanism prior to transfer of the product package from the first conveyor mechanism to the third conveyor mechanism; and transferring the product package from the first conveyor mechanism to the third conveyor mechanism.

18. The method of claim 17, wherein, when the product package is supported on the first and second carriers, the first and second engagement surfaces contact a flange portion of the product package to suspend a portion of the product package between the first and second carriers.

19. The method of claim 16, wherein the processor is used to determine if at least one of the first upwardly-facing label and the second downwardly-facing label is mislabeled.

20. The method of claim 19, wherein the movement of the product package on the first and second carriers, the capture of the pictures and/or video, and the actuation of the actuator is controlled by a computer system.

* * * * *